United States Patent [19]

Richard

[11] 4,121,052

[45] Oct. 17, 1978

[54] TELEPHONE DATA RECORDING SYSTEM

[76] Inventor: Herbert L. Richard, 1555 Farlow Ave., Crofton, Md. 21113

[21] Appl. No.: 808,196

[22] Filed: Jun. 16, 1977

Related U.S. Application Data

[63] Continuation of Ser. No. 652,325, Jan. 26, 1976, abandoned.

[51] Int. Cl.$^2$ ............................................. H04M 17/00
[52] U.S. Cl. ............................. 179/2 DP; 179/84 VF; 179/90 AN; 364/200
[58] Field of Search ...................................... 179/2 DP

[56] References Cited

U.S. PATENT DOCUMENTS

| | | | |
|---|---|---|---|
| 3,371,162 | 2/1968 | Scantlin | 179/2 DP |
| 3,556,530 | 1/1971 | Barr et al. | 179/2 DP |
| 3,582,554 | 6/1971 | Le Blanc | 179/2 DP |
| 3,865,994 | 2/1975 | Bender | 179/2 DP |
| 3,870,821 | 3/1975 | Steury | 179/2 DP |
| 3,872,260 | 3/1975 | Oatis | 179/90 D |
| 4,007,443 | 2/1977 | Bromberg et al. | 179/2 DP |
| 4,012,594 | 3/1977 | Paller | 179/2 DP |

FOREIGN PATENT DOCUMENTS

| | | | |
|---|---|---|---|
| 2,237,631 | 4/1973 | Fed. Rep. of Germany | 179/2 DP |
| 2,456,825 | 6/1975 | Fed. Rep. of Germany | 179/2 DP |
| 950,739 | 2/1964 | United Kingdom | 179/2 DP |

Primary Examiner—George G. Stellar
Attorney, Agent, or Firm—Lowe, King, Price & Becker

[57] ABSTRACT

A system is disclosed for recording incoming, numerically-encoded telephone messages generated by a caller via his touch-tone or rotary dial, and successively visually displaying the messages at the called telephone. The system includes an answer actuator for capturing the telephone line in response to an incoming ringing signal, and a memory circuit for storing incoming messages. Each numerically-encoded message is stored as a data set having a predetermined number of digits in a memory capable of storing several messages. In response to read-out command signals, the messages are successively transferred to a visual display. Each message may represent a telephone number where the caller can be reached, or other information such as a numerically-encoded instruction or message.

6 Claims, 15 Drawing Figures

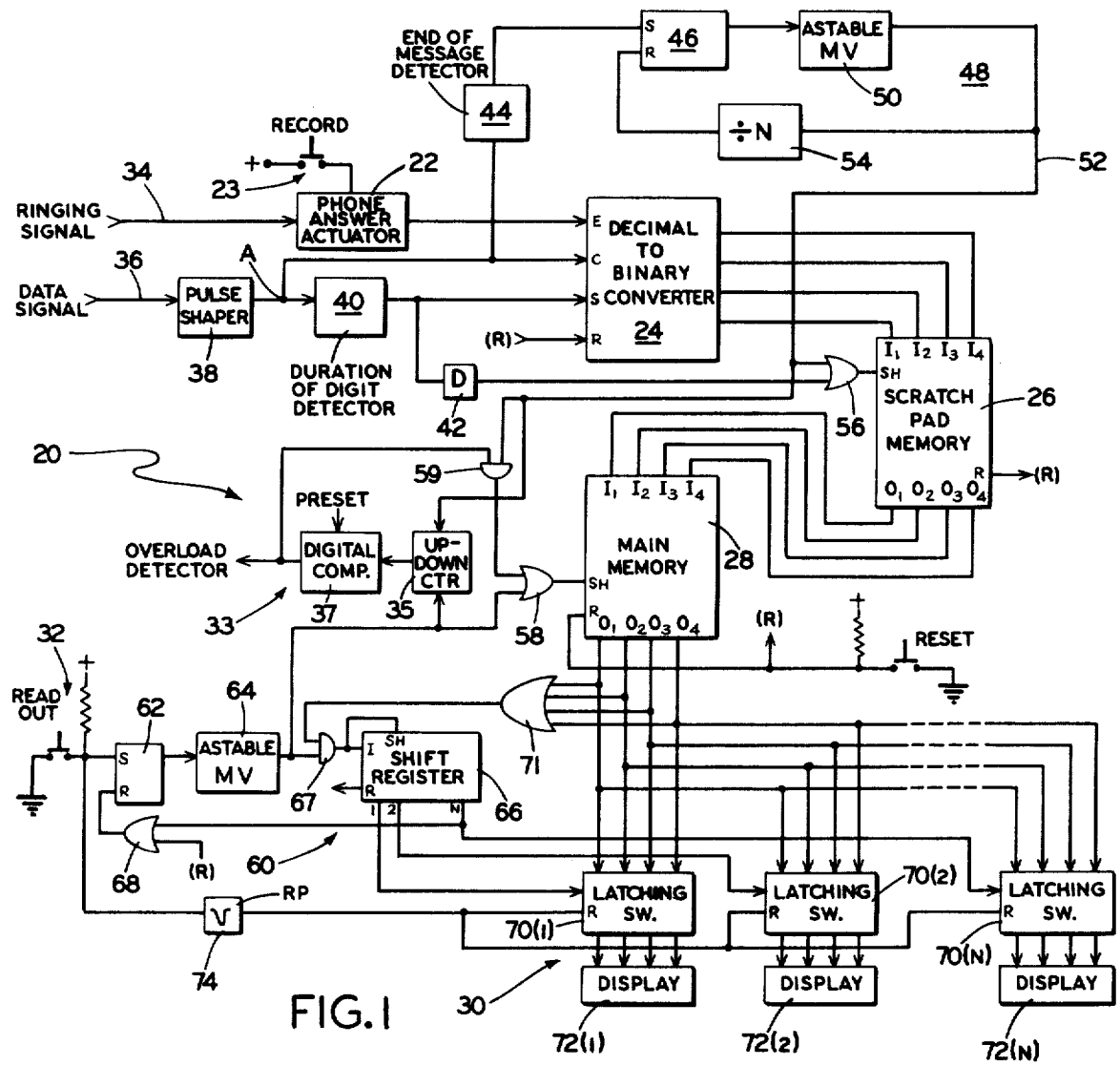
FIG.3A  MESSAGE DIGITS
FIG.3B  END OF MESSAGE
FIG.3C  PULSE GENERATED BY DETECTOR 44
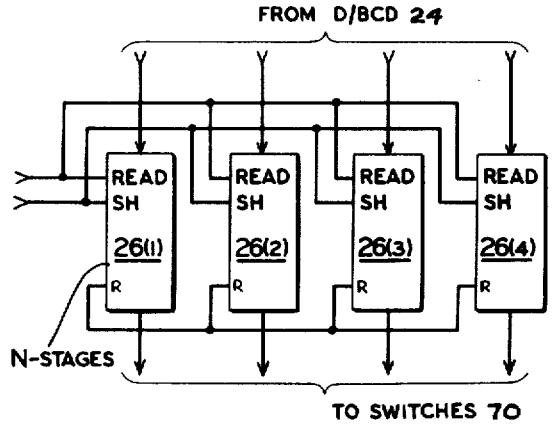
FIG.4
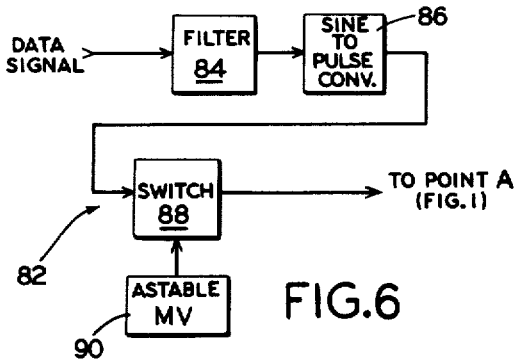
FIG.6

TELEPHONE DATA RECORDING SYSTEM

This is a continuation of application Ser. No. 652,325, filed Jan. 26, 1976, now abandoned.

BACKGROUND OF THE INVENTION

The present invention relates generally to telephone recording systems, and more particularly to a telephone recording system wherein telephone numbers or numerically-encoded messages are stored and successively visually displayed on command.

Tape recording units have been commonly used to record information associated with incoming calls, i.e., messages generated by a number of different callers. An answer actuator, connected to the telephone line at the called telephone, captures the telephone line in response to receipt of a ringing signal generated by the caller. The actuator also initiates operation of the recorder. The recorder first plays a pre-recorded instructional message and then automatically switches to a "record" mode to record verbal information from the caller. Such information may include the telephone number where the caller can be reached, or other verbal information such as order placing, etc.

The recorded information is played out of the recorder in serial form, that is, the called party must listen to each message in the order in which the message was recorded. Although generally satisfactory for many uses, this type of read-out is extremely slow. In many instances, the only information contained in the recording is the telephone number where the caller can be reached, or numerical information routinely processed by a dispatcher or order taker, such as a part number or quantity. This information could be determined at a glance. There exists a need to provide a quick visual read-out of stored number data on command.

In other instances, audio reproduction of incoming messages is inconvenient or unacceptable. For example, during a conference, a secretary may wish to notify her supervisor of an incoming call or convey a message to her supervisor while he or she is in conference. The supervisor cannot interrupt the conference to answer the telephone, and frequently no response is even required. Accordingly, there exists a need for a means of non-verbally relaying messages, via telephone, thus permitting a called party to view each message on command, without disrupting a conference or other personnel. The called party can then decide whether or not it is necessary to respond to the message.

OBJECTS OF THE INVENTION

One object of the present invention is to provide a new and improved system for recording incoming messages at a called station.

Another object of the present invention is to provide a system for visually displaying incoming messages.

Another object of the present invention is to provide a new and improved recording system connected to the telephone lines for recording incoming messages for visual display.

Still another object of the present invention is to provide a new and improved telephone recording system, wherein several sets of incoming messages are stored at a called station, and then successively visually displayed on command.

Still another object of the present invention is to provide a new and improved telephone recording system which provides rapid read-out of stored messages on command.

Yet another object of the present invention is to provide a new and improved telephone recording system wherein recording verbal information is unnecessary.

Still another object of the present invention is to provide a new and improved telephone recording system which is compact, inexpensive, and easy to operate.

Yet another object of the present invention is to provide a new and improved telephone data recording system that is contained at a telephone set, and wherein no central office or utility pole-mounted equipment is required.

SUMMARY OF THE INVENTION

In accordance with the invention a telephone recording system comprises signal detector circuitry for converting numerically-encoded messages generated via the "touch-tone" or "rotary" dial by a caller into digital signals, and storing the signals in memory circuitry. Sets of the digital signals constituting individual messages, or "words", e.g., a caller's ten-digit telephone number, are stored in the memory circuitry, and are successively transferred to a visual display on command by the called party.

An answer actuator, when placed in a "ready" mode, causes the telephone to capture the telephone line, i.e., to take the telephone "off-hook", in response to a ringing signal generated by the caller. The actuator also turns on a power supply for powering the system and supplies an enable signal to a decimal-to-binary converter for receiving incoming message data.

After the called telephone has captured the telephone line, the caller generates numerically-encoded message data via the touch-tone or rotary dial of his telephone set. Pulses generated by the rotary dial are filtered in a pulse shaper to eliminate noise and steepen the pulse edges, and are supplied to the enabled decimal-to-binary converter. In a touch-tone system, a frequency-to-pulse train converter converts the push-button tones to pulses and supplies the pulses to the decimal-to-binary converter. A duration of digit detector (one-shot multivibrator) at the decimal-to-binary converter controls the sampling time of the converter in response to the incoming pulses.

In a first embodiment, the output of the decimal-to-binary converter is connected to the input of a scratch-pad memory having N-stages of storage. Each output of the decimal-to-binary converter, which is the binary equivalent of a decimal digit generated by the caller, is stored in the scratch-pad memory. In practice, I make N = 10 so that the scratch-pad memory is capable of storing a ten-digit telephone number.

An end of message detector (integrator), which is responsive to a delay time between input pulses greater than a predetermined delay time, actuates a first N-pulse pulse train generator that causes transfer of the contents of all N stages of the scratch-pad memory, constituting a single message, to a larger main memory. The main memory is large enough to store several messages successively unloaded from the scratch-pad memory. The output of the main memory is controlled by a read-out control circuit comprising a second N-pulse pulse train generator. This generator includes an N-stage shift register that successively addresses each digit of a set of N-digit display units. In response to operation of a read-out button, the shift register causes the main memory to successively transfer the stored digits of a numerically-encoded N-digit message to the display units thereby visually displaying one message.

In a second embodiment, the output of the digital-to-binary converter is connected directly to the main memory; there is no scratch-pad memory required. Each digit of an incoming message is loaded into the main memory under the control of the end of digit detector. The end of digit detector also supplies precount pulses to the first N-pulse pulse generator to preset the generator with M counts, where M is the number of digits in the message, and is less than or equal to N. At the end of the message, determined by the end of message detector, the generator supplies (N-M) pulses to the shift input of the main memory, thereby causing an N-digit message or data block to be stored therein (N-M stages of the memory contain no information).

In each embodiment, an overload indicator monitors the data loaded into the main memory as well as the data unloaded therefrom and transferred to the display units, and inhibits further loading when the main memory has been overloaded with message data.

The main memory is operated in a first in — first out basis, and is preferably formed of shift registers for economy, with the binary coded sets of message data stored in series. In response to operation of the read-out button, a multivibrator advances the earliest recorded message to the outputs of the shift registers and then unloads that message to the display units. Alternatively, the main memory may be formed of a random access memory with messages read out in the order in which they were stored using addressing.

I am aware of U.S. Pat. No. 3,787,626 to Subreta, disclosing a system for automatically relaying a caller's telephone number to a called party before the called party answers his telephone. However, Subreta's system is responsive to pulses generated by the caller prior to the called party's capturing the telephone line, and these pulses represent only the caller's telephone number. There is no provision for generating numerically-encoded messages to the called party after capture of the telephone line. There is furthermore no provision for storing multiple messages, and successively visually displaying them on command. Also, Subreta's system must be located at a central office or on a telephone pole.

Still other objects and advantages of the present invention will become readily apparent to those skilled in this art from the following detailed description, wherein I have shown and described only the preferred embodiments of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWING

FIG. 1 is a block diagram of one embodiment of the present invention;

FIGS. 3A-3C are signal diagrams illustrating the operation of the end of message detector shown in FIG. 1;

FIG. 4 is a detailed diagram of the scratch-pad memory of FIG. 1, showing the shift register components;

FIG. 6 is a diagram of one embodiment of a push-button tone-to-pulse train converter for operation in a touch-tone system;

DETAILED DESCRIPTION OF THE PREFERRED EMBODIMENTS

Figure 5:
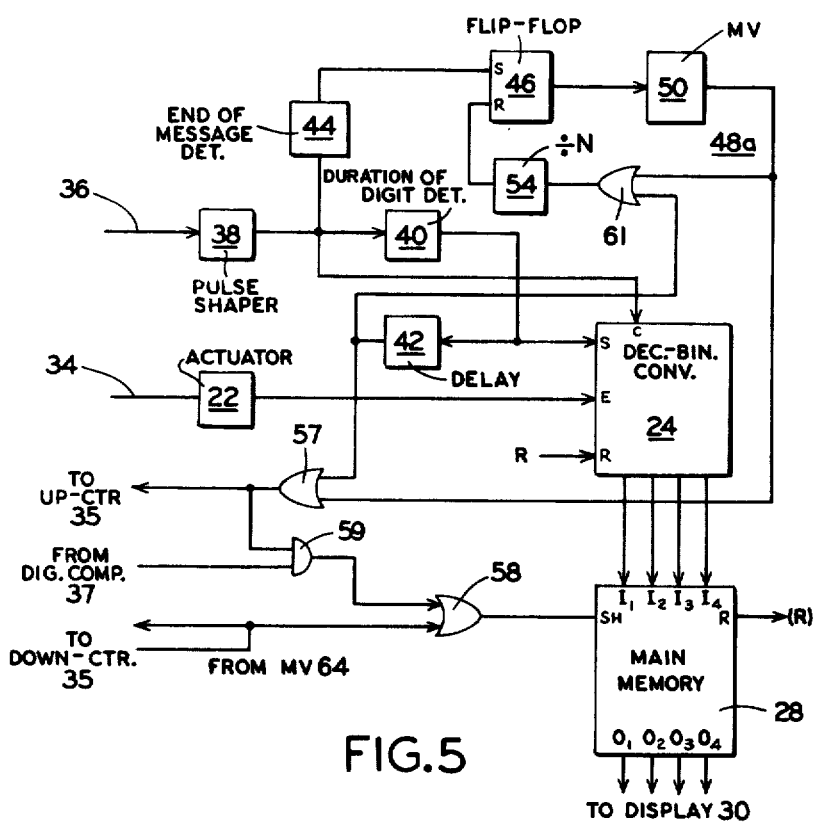
FIG. 5 is a partial block diagram of another embodiment of the invention wherein no scratch-pad memory is required.

Referring to FIGS. 1 and 5, a telephone recording system 20, in accordance with the present invention, comprises a conventional telephone answer actuator 22 which, in response to a ringing signal on the telephone line, causes the telephone to "capture" the line. The actuator 22 also energizes a power supply (not shown) operating the digital circuitry constituting system 20 and enables decimal-to-binary converter 24. Converter 24 converts numerically-encoded data, received at the telephone, into digital signals that are stored in a main memory 28. In the embodiment of FIG. 1, each message is temporarily stored in a scratch-pad memory 26 and then transferred to the main memory 28 as a data set. In the embodiment of FIG. 5, each message is directly transferred to main memory 28 as a data set under the control of a presettable N-pulse pulse train generator 48a. In both embodiments, several sets of numerically-encoded data (messages) are successively stored in the main memory 28. The messages are then successively transferred to display circuitry 30 in response to operation of read-out control 32.

Referring now to the embodiment of FIG. 1 in more detail, in ringing signal on line 34 is detected by a conventional phone answer actuator 22 that has been readied by being placed in a "record" mode via a record switch 23. The record switch 23 is preferably mounted on or in proximity to the telephone set (see FIGS. 8 and 9). Besides converting the telephone set to an "off-hook" condition to capture the telephone line, phone answer actuator 22 also connects a power supply (not shown) to the logic circuitry contained in system 20, but the memory circuitry is continuously energized so as to retain any message data stored therein. However, if the memory circuitry is non-volatile, such as core, the memory may also be de-energized to conserve power.

Phone answer actuator 22 also supplies an enable signal to terminal E of decimal-to-binary converter 24. The phone answer actuator 22 subsequently releases the telephone line and de-energizes the logic circuitry in response to the calling phone's returning on-hook, or after a predetermined period of time, in a conventional manner.

The numerically-encoded message data which, in the embodiment of FIG. 1, is generated by the caller via a conventional rotary telephone dial, are in the form of pulse trains on data line 36. These pulses are supplied to pulse shaper 38 which eliminates any noise from the pulses and steepens the leading and trailing edges, and supplies the shaped pulses to count terminal C of decimal-to-binary converter 24. The output of pulse shaper 38 is also supplied to end of message detector 44 as well as to duration of digit detector 40.

Figure 2A:
FIGS. 2A and 2B are signal diagrams illustrating the operation of duration of digit detector shown in FIG. 1.

The numbers of pulses constituting the data pulse trains at the output of shaper 38 correspond to the numbers dialed by the caller. For example, in FIG. 2A, the pulses shown represent the number 42 (the first pulse train contains four pulses and the second pulse train contains two pulses). A series of digits forming a message, hereinafter termed "set" contains up to 10 digits, e.g., a 10-digit telephone number. As described in detail infra, messages are stored in 10-digit sets, and if a message contains fewer than 10 digits e.g. M digits, (10 − M) storage spaces in the storage set remain unoccupied, but the message is stored in memory as a complete 10-digit set.

Figure 2B:

Decimal-to-binary converter 24 samples each train of pulse; (FIG. 2), and converts the train to a binary-coded signal. For example, decimal-to-binary converter 24 would, in operation, convert the digits 4 and 2 respectively to 0100 and 0010. Duration of digit detector 40, which may be a conventional integrator or pulse detector, supplies an activating signal to terminal S of converter 24 during the presence of an incoming pulse train (see FIGS. 2A and 2B). During activation of input terminal S, converter 24 counts the incoming pulses (FIG. 2A), and when the output signal of duration digit detector 40 is removed (FIG. 2B), converter 24 accumulates the pulse count and generates a corresponding binary-coded signal. This binary-coded signal is stored in scratch-pad memory 26.

The operation of scratch-pad memory 26 is synchronized to the output of duration of digit detector 40. Delay circuit 42, connected between detector 40 and memory 26, delays the trailing edge of the output signal of detector 40 before supplying the detector signal to the read and shift input terminals of scratch-pad memory 26. Accordingly, shortly after the development of the binary-coded digit by converter 24, the binary-coded digit is stored in the memory 26. Delay 42 is necessary to ensure that the binary-coded number is fully developed before it is transferred to the memory 26. Each time a digit is developed, controlled by detector 40, the binary-coded representation of the digit is stored in scratch-pad memory 26, and previously stored digits are shifted.

The scratch-pad memory 26 is comprised of four shift registers 26(1)–26(4) connected in parallel to each other, and each shift register contains N stages (FIG. 4). N = 10 is chosen so that scratch-pad memory 25 is capable of storing a ten-digit telephone number, as aforementioned, but a larger or smaller number of stages of storage could be provided. As will be described in more detail infra, the number of stages of storage in scratch-pad memory 26 determines the size of the data sets processed in system 20.

At the end of each incoming message (up to ten digits), determined by an end of message detector 44, the contents of all ten stages of scratch-pad memory 26 are transferred to main memory 28. If fewer then ten stages of scratch-pad memory 26 are used, e.g., a four-digit code is stored, six of the stages transferred to main memory 28 will contain no information, but the contents of all 10 stages will be transferred as a single block or set of data.

Ead of message detector 44 is preferably an integrator circuit for detecting the absence of a pulse for a predetermined duration of time. The absence of pulses indicates that no additional digits are intended to be sent by the caller. Of course, it is necessary that the caller not hesitate too long between generation of successive digits of a message, but the predetermined duration is set for at least several seconds to avoid generation of unintended end-of-message signals. Optionally, detector 44 may be a filter circuit responsive to the tone generated by an auxiliary button (# or *), in a conventional touch-tone system, manually operated by the caller for indicating end of message.

Referring to FIG. 3A, a message containing three digits, i.e., four, three, and two, is represented by three pulse trains containing respectively four, three, and two pulses. These pulses are integrated to form the waveform shown in FIG. 3B. It is noted that although the magnitude of the waveform in FIG. 3B decreases somewhat between adjacent pulse trains, the magnitude does not approach zero until after the occurrence of the two-digit pulse train (which is at the end of the message). In response thereto, detector 44 generates a pulse, shown in FIG. 3C, to R-S flip-flop 46 of N-pulse pulse train generator 48.

N-pulse pulse train generator 48 (FIG. 1), where N equals 10 in the preferred embodiments, generates N shift pulses to scratch-pad memory 26 in response to a pulse generated by detector 44, and serves to transfer the contents of the N-stage scratch-pad memory 26 to main memory 28. Pulse generator 48 includes an astable multivibrator 50, controlled by flip-flop 46. A divide-by-N divider circuit is connected between the output of astable multivibrator 50 and the reset terminal R of flip-flop 46. In operation, the pulse generated by end of message detector 44 sets flip-flop 46 which in turn enables astable multivibrator 50. Multivibrator 50 provides a pulse train at output line 52, and divide-by-N divider circuit 54 feeds the Nth pulse back to reset terminal R of flip-flop 46, thereby resetting the flip-flop and disabling multivibrator 50. The pulse train output of generator 48 is supplied to one input of OR gate 56 in turn connected to shift input SH of scratch-pad memory 26.

The output of pulse train generator 48 is also connected to the shift input SH of main memory 28, via AND gate 59, and OR gate 58. This arrangement, as discussed in more detail infra, causes each digit, unloaded from scratch-pad memory 26, to be individually loaded into main memory 28. The other input of AND gate 59 is connected to the output of overload circuit 33. As also discussed infra, this connection prevents any overloading of main memory 28.

At the end of message, determined by end of message detector 44, pulse generator 48 generates an N-pulse pulse train to transfer the contents of the N-stages of scratch-pad memory 26 to main memory 28. No new data are read into scratch-pad memory 26 until new message digits are received by the system 20 and new shift pulses are generated by duration of digit detector 40. As aforementioned, main memory 28 has a storage capacity large enough to accommodate several sets of N-digit messages loaded from scratch-pad memory 26 and, in practice, I provide at least 100 stages of storage in the main memory to accommodate ten sets of ten-digit messages.

Each set of message digits is unloaded from main memory 28 on command by closing read-out switch 32. Read-out switch 32 controls the operation of a second N-pulse pulse train generator 60 (where N = 10) comprising an R-S flip-flop 62, an astable multivibrator 64 and an N-stage shift register 66.

Closure of read-out switch 32 causes a logic 0 to be applied to the set terminal S of flip-flop 62 thereby causing the output of the flip-flop to go to logic 1. The logic 1 output of flip-flop 62 turns on astable multivibrator 64, and the pulses generated by the astable multivibrator are supplied through one input of AND gate 67, to the input I and shift terminal SH of shift register 66. Pulses, generated by astable multivibrator 64 are also supplied to shift input SH of main memory 28 through OR gate 58. Pulses, generated by the multivibrator 64 are, however, not loaded into shift register 66 for causing display of output of memory 28 until the earliest message digit, stored in the memory, has been shifted down to the memory output. This prevents any "data gaps" from occurring during read-out requiring the user to successively operate read-out button 32 until a message appears on display 30. Shift register 66 does not enable read-out of memory 28 until a message digit has been shifted down to the memory output because the pulses generated by generator 60 are not loaded into the shift register 66 until a logic 1 appears at any of the output terminals of main memory 28, monitored by OR gate 71. The output of OR gate 71 is connected to AND gate 67 in pulse generator 60. Thus, in response to a closure of read-out switch 32, multivibrator 64 generates pulses that shift data stored in main memory 28 until a first message digit (containing at least one logic 1 bit) is detected at the output of the memory by OR gate 71 (obviously, this requires that the first binary-encoded message digit not contain all zeros). Then, the pulses generated by multivibrator 64 are also loaded into input I of register 66 via AND gate 67, and shift register outputs 1, 2 . . . N successively go to logic 1. When the Nth output of shift register 66 is at logic 1, this logic 1 signal is fed back to the reset terminal R of flip-flop 62, via OR gate 68 to reset flip-flop 62 and turn-off astable multivibrator 64. At that time, the outputs 1, 2 . . . N of shift register 66 are all at logic 1, and remain in that state until the shift register is reset by a logic 0 signal applied to the reset terminal R of the shift register. This occurs when system 20 is reset manually via a reset switch RESET (FIG. 1), or by a reset pulse RP generated by read-out switch 32. The N pulses generated by multivibrator 64 during loading of stages 1, 2 . . . N of register 66 are also supplied to the shift input SH of main memory 28. The result is that the earliest N-digit data set stored in memory 28 and serially "lined up" at the output, is unloaded therefrom.

The outputs of main memory 28 are connected to the data inputs of latching switches 70(1), 70(2) . . . 70(N). The outputs of switches 70(1), 70(2) . . . 70(N) are connected respectively to display units 72(1), 72(2) . . . 72(N). Display units 72 are any suitable alpha-numeric display unit such as nixie tubes, liquid crystal, or light-emitting diode displays. The displays 72 also contain conventional binary-to-decimal conversion circuitry for decoding the four-bit binary-encoded data input to decimal data for operating the display.

Latching switches 70(1), 70(2) . . . 70(N) are controlled by the outputs of shift register 66. The output terminals 1, 2 . . . N of register 66 are connected respectively to the control inputs of switches 70(1), 70(2) . . . 70(N), and as the shift register is loaded with logic 1 pulses, the switches successively turn on, thereby energizing the respective display units. Each latching switch 70 is conventional, and after latched on to store a digit, blocks out any additional digits, supplied to its input, until reset.

The first pulse generated by astable multivibrator 64 that is loaded into shift register 66 causes output 1 of the shift register to go to logic 1. Since output 1 of shift register 66 is connected to the control input of switch 70(1), that switch latches on, and the digit unloaded from main memory 28 is transferred to display 72(1), via switch 70(1). The second pulse generated by astable multivibrator 64 unloads another digit from main memory 28, and this digit is supplied to display 72(2) via switch 70(2) latched on by the signal at terminal (2) of shift register 66. At this time, there are logic 1 outputs at both terminals (1) and (2) of shift register 66, and the first and second digits are stored respectively in latching switches 70(1) and 70(2). The unloading of main memory 28 continues until all digits of a message are loaded into the latching switches 70(1) 70(2) . . . 70(N). These switches 70 remain latched and store the respective digits, successively unloaded from main memory 28, so that the message remains visible on display units 72(1), 72(2) . . . 72(N).

The latching switches 70(1), 70(2) . . . 70(N) are subsequently reset by supplying a logic 0 signal to the reset terminals R of the switches. This is effected automatically each time read-out switch 32 is depressed just prior to generation of pulses by astable multivibrator 64. Logic racing is avoided since there is inherent delay associated with flip-flop 62 and astable multivibrator 64, so that switches 70(1), 70(2) . . . 70(N) are reset prior to loading of new data controlled by output terminals 1, 2 . . . N of shift register 66. Differentiator 74, connected between the output of read-out switch 32 and the latching switches 70(1), 70(2) . . . 70(N) causes only a single reset pulse to be generated even if read-out switch 32 is maintained closed by the user, and this prevents accidental reset during unloading of main memory 28.

Summarizing the loading and unloading of digits with respect to main memory 28, at the end of each incoming message, a pulse generated by detector 44 causes an N-digit data set containing an M-digit message to be transferred from scratch-pad memory 28 to main memory 28. Main memory 28 is capable of storing P data sets, and in practice, I make N equal to ten and P at least about ten. When a message is to be read out, operation of read-out button 32 initiates oscillation of multivibrator 64 to shift the earliest stored message in memory 28 down to the memory output. Then, under control of N-stage shift register 66, the earliest stored data set is unloaded from memory 28 to display 30.

Obviously, it is necessary that additional messages be inhibited from being transferred from scratch-pad memory 26 into the main memory 28 when the main memory is loaded to capacity. Overload monitor 33 (FIG. 1) inhibits the shift input of main memory 28, and supplies an overload indication whenever the main memory is filled to capacity (contains ten messages). Monitor 33 comprises an up/down counter 35 which is up-counted by the output of N-pulse pulse train generator 48 (loading main memory 28) and down-counted by the output of N-pulse pulse train generator 60 (unloading main memory 28). The output of up/down counter 35 is compared to a preset number (indicating memory capacity) in comparator 37. An output from the comparator is supplied as an alarm to the user, and also fed back to AND gate 59 to inhibit additional loading of main memory 28. Any additional loading of memory 28 would cause loss of message data by passing the earliest stored messages out of the memory via output terminals $O_1$-$O_4$ thereof.

Referring now to FIG. 5, a second embodiment of system 20 is described, wherein scratch-pad memory 26 is not required. In FIG. 5, each M-digit message is transferred directly from counter 24 to main memory 28 as an N-digit data set (N-M digits of the data set are encoded as all-zeros and carry no information). At the end of each message digit incoming on line 36, a pulse generated by duration of digit detector 40, is supplied (1) to terminal S of counter 24 in order to convert the incoming digit to a binary-encoded digit, and (2) to shift terminal SH of main memory 28, via delay 42 and gates 57, 58 and 59, to store the binary-encoded digit in the memory. The output of delay is also connected to one input of OR gate 61 in generator 48. The other input of OR gate 61 is connected to the output of multivibrator 50. The function of OR gate 61 is to store counts in divider 54 in response to pulses generated either by multivibrator 50 or by duration of digit detector 40. Thus, assuming an M-digit message is received on line 36, divider 54 becomes preset to the count M, and the M digits are stored in memory 28 in response to M pulses generated by duration of digit detector 40. At the end of the message, in response to a pulse generated by end of message detector 44, multivibrator 50 is enabled. However, multivibrator 50 generates only (N-M) pulses before it is reset by divider 54 and flip-flop 46, because the (N-M)th pulses, generated by the multivibrator is fed back through the divider. The (N-M) pulses, generated by multivibrator 50, shift the M-digit message, stored in main memory 28, another (N-M) stages so as to be stored as an N-digit data set. This is the same result provided by scratch-pad memory 26 in FIG. 1.

The discussion of system 20 has been directed toward a rotary dial telephone system, i.e., wherein message data are generated using the rotary dial of the telephone. The rotary dial generates pulse trains having numbers of pulses corresponding to the number dialed. However, in a touch-tone system, the pulse shaper 38 is replaced by a touch-tone converter circuit. The touch-tone converter circuit converts the audio tones, generated in response to operation of each of the buttons of a touch-tone dial, to a pulse train having a number of pulses corresponding to the particular button operated. Such converters are well-known in the prior art, and are referred to in *Electronics*, Dec. 11, 1975, at page 100. One example of such a converter circuit is shown in FIG. 6.

Figure 7A:
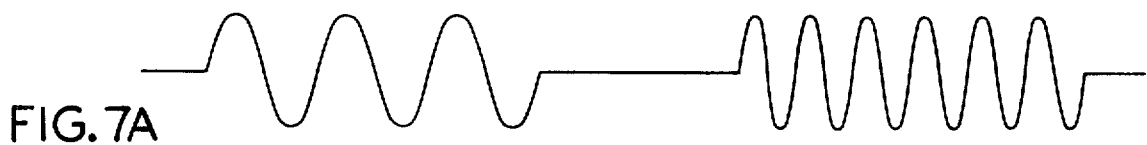
FIGS. 7A-7D are diagrams of signals generated by the elements shown in FIG. 6.
Figure 7B:
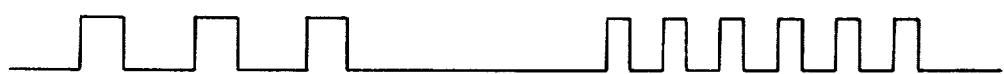
Figure 7C:
Figure 7D:

Referring to FIG. 6, touch-tone converter 82 comprises a filter 84 for filtering extraneous noise from a two-frequency touch-tone audio signal, and converting the two-frequency touch-tone audio signal to a single-frequency signal representation of the touch-tone button operated. This may, for example, be effected using a memory which is hardwire programmed to generate a pulse train having a length corresponding to the address created by the incoming touch-tone signals. The output of filter 84 is shown in FIG. 7A, which represents two successive touch-tone signals wherein the second signal has a higher frequency. Obviously, the waveform in FIG. 7A is much shorter than the waveforms generated in practice, but is exemplary of the frequency relationships. The output of filter 84 is supplied to sine-to-pulse converter 86 which converts the sinusoid to pulses, as shown in FIG. 7B. The pulse density of second pulse train is larger than the first in correspondence with the sinusoids in FIG. 7A. The output of the sine-to-pulse converter 86 is sampled with a switch 88 controlled by a fixed frequency astable multivibrator 90. The output of multivibrator 90 is shown in FIG. 7C, and causes switch 88 to transfer pulses generated by converter 86 within constant time intervals. The output of switch 88 shown in FIG. 7D, is thus proportional to the frequency of the signal at the output of converter 86, and corresponds to the data signal at the input of filter 84. For example, pulse frequency converter 92 generates a pulse train having three pulses in response to an incoming touch-tone signal generated by the touch-tone button "3" on the telephone set.

Figure 8:
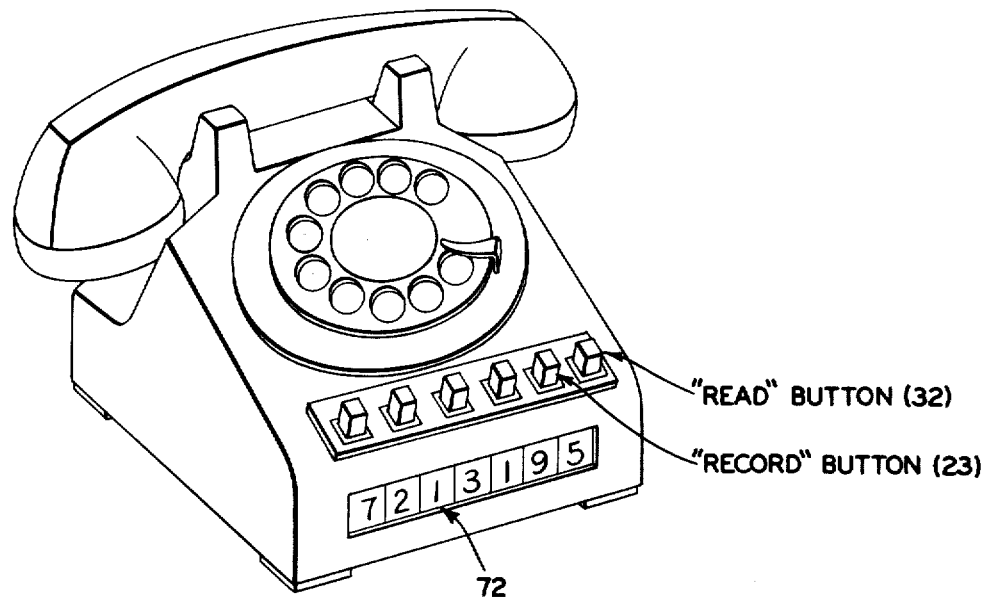
FIG. 8 is a perspective view of a telephone having the present invention incorporated therein.
Figure 9:
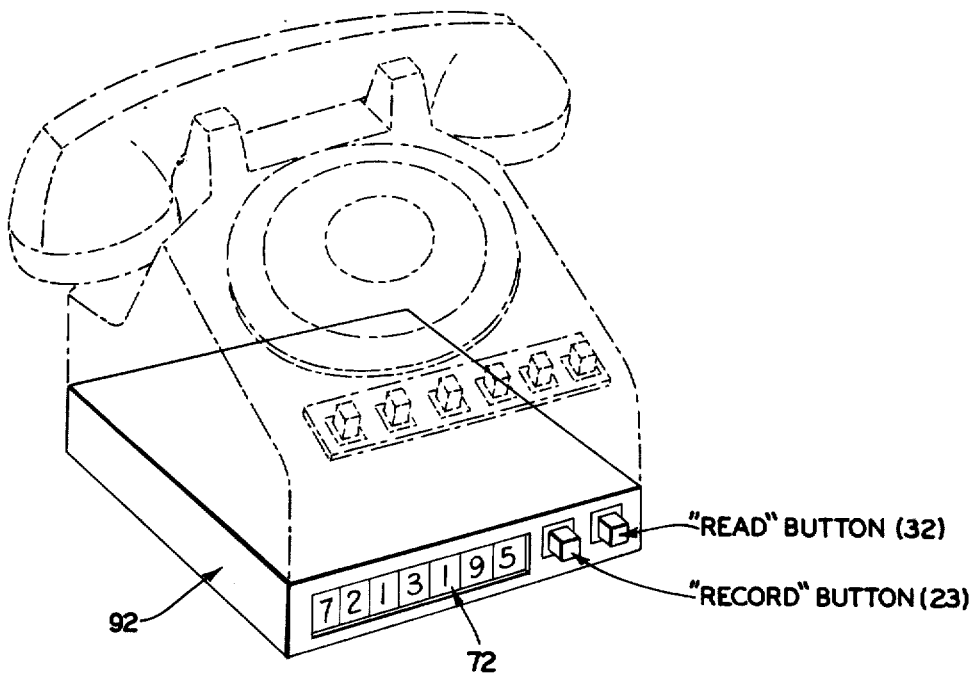
FIG. 9 is a perspective view of a module containing the system of the present invention attached to the bottom of a telephone.

System 20 can be incorporated directly within an office telephone set, as shown in FIG. 8, with unused buttons functioning as the record button and read button operating respectively phone answer actuator 22 and read-out switch 32 in FIG. 1. Display units 72 are exposed through a rectangular aperture formed in the casing of the telephone. Optionally, system 20 can be provided as a separate module 92 (FIG. 9) mounted in proximity to the telephone set or attached to the bottom thereof, as shown. The read button and record button, as well as the display 72, are provided on the exterior of the module.

In summary, a message recording system for a telephone, for visually displaying message data transmitted via the touch-tone or rotary dial of a telephone set has been described. The system is comprised of solid state circuitry that captures the telephone line in response to a ringing signal, and then stores numerically-encoded messages transmitted by the caller via his dial. The messages are then successively displayed on an alphanumeric display panel, on command. The circuitry is preferably comprised of integrated circuit modules, such as CMOS, but other logic families could be used, as well as discrete components. The entire system is light and compact, and consumes very little power. Where a modular unit is used, as in FIG. 9, the system 20 can be adapted for use with any of the various telephones in an office, and the converter circuit 82 (FIG. 5) permits use with touch-tone, as well as rotary dial, telephone sets. Also, the system 20 can be hard-wire coupled to the telephone line, or could be magnetically or sonically coupled thereto. Of particular importance, system 20 is connected up at the telephone set itself, rather than at a central office or telephone pole.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein. For example, although a 10-digit data set has been described, obviously, other numbers of digits could be used. For example, in a four-digit system, which would be suitable for relaying most numerically-encoded messages, and telephone extension numbers, scratch-pad memory 26 would comprise a set of four-stage shift registers, and main memory 28 would comprise a set of 40-stage shift registers, large enough to store 10 sets of messages.

What is claimed is:

1. A system for transferring messages via telephone lines comprising:
   means for generating a call signal from a first telephone to a second telephone over the telephone lines;
   means at said second telephone for detecting said call signal and in response thereto causing said second telephone to capture the telephone lines;
   means at said first telephone for generating on the lines a single, complete, variable length digital message associated with said call signal, said variable length message having M digitally encoded characters, where $1 \leq M \leq N$, N being a constant;

means at said second telephone for storing successive, incoming ones of said variable length messages, said storage means including a memory having a plurality of storage banks, each of said storage banks containing N storage locations for storing up to N digitally encoded characters, means for generating a gating signal corresponding to the length of each character of the incoming, variable length message, converter means responsive to said gating signal for converting said incoming, digital characters to binary coded signals, means for detecting the end of the incoming, variable length message, pulse generator means for generating N pulses, means for shifting said binary coded signals into said memory in response to the N pulses generated by said pulse generator, means responsive to said end of message detecting means for operating said pulse generator to shift the M binary coded characters of said incoming message into an N stage storage bank of said memory, (N-M) storage locations of said bank thereby remaining empty;

display means at said second telephone for visually displaying only one complete message; and readout means at said second telephone for successively reading out single ones of said stored messages to said display means, said readout means displaying the content of only one storage bank each time said readout means is activated, each readout containing a single complete, stored message.

2. The system of claim 1, wherein said message generating means at said first telephone comprises telephone dial means.

3. The system of claim 1, wherein the said memory comprises a scratch pad memory and a main memory, means responsive to said gating signal for loading said scratch pad memory with binary coded characters generated by said converter means, and means responsive to said end of message detecting means and said pulse generator means for shifting the characters stored in said scratch pad memory into said main memory.

4. The system of claim 1, wherein the said pulse generator includes means responsive to said gating signal for generating M pulses for shifting the M binary coded characters into said memory, and means responsive to said end of message detecting means for generating an additional (N-M) pulses to shift said M message into N stage storage bank in said memory.

5. The system of claim 1, wherein said display means is adapted to form a base of said second telephone.

6. The system of claim 1, wherein said display means is exposed through an opening formed in a casing of said second telephone.

* * * * *